United States Patent Office 3,460,651
Patented Aug. 12, 1969

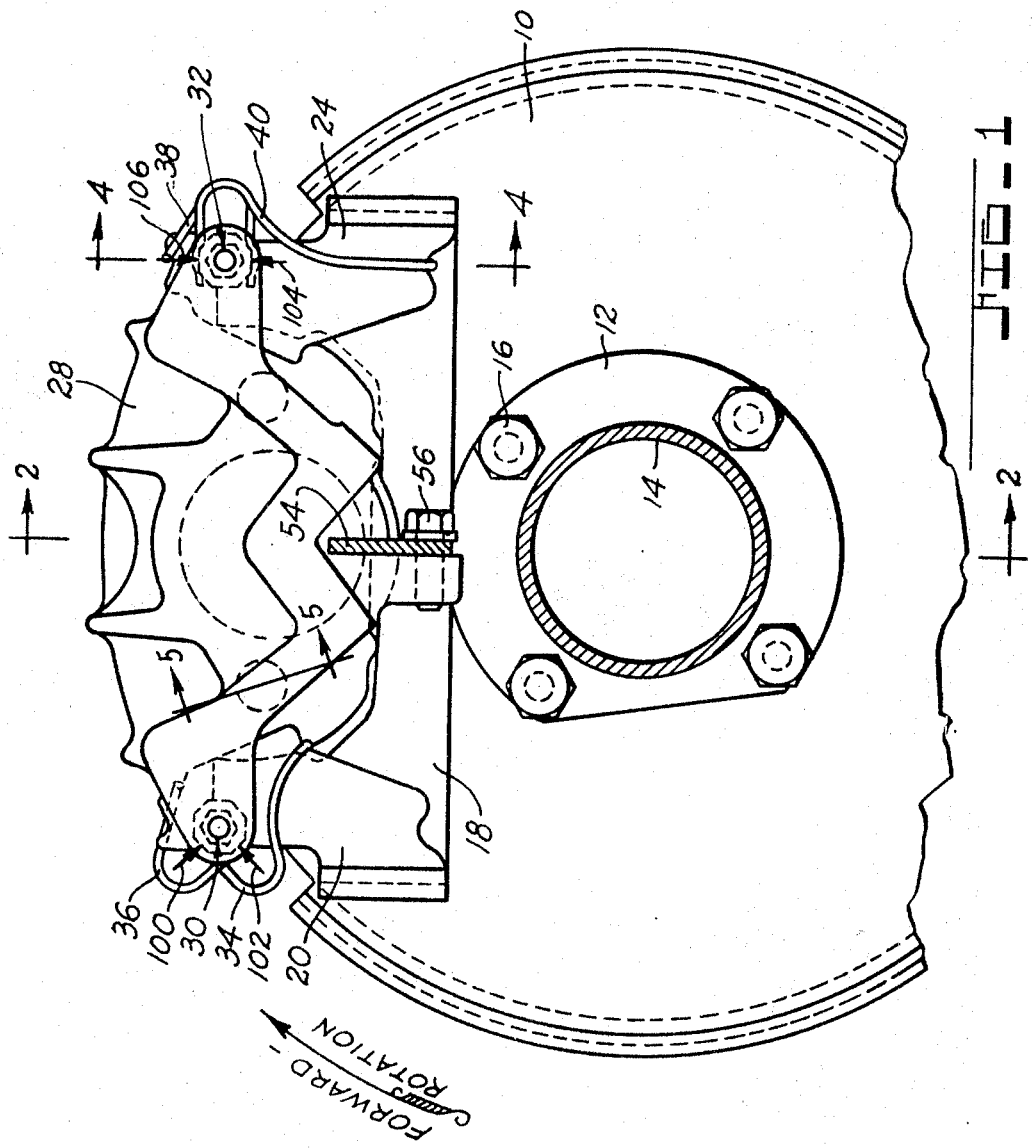

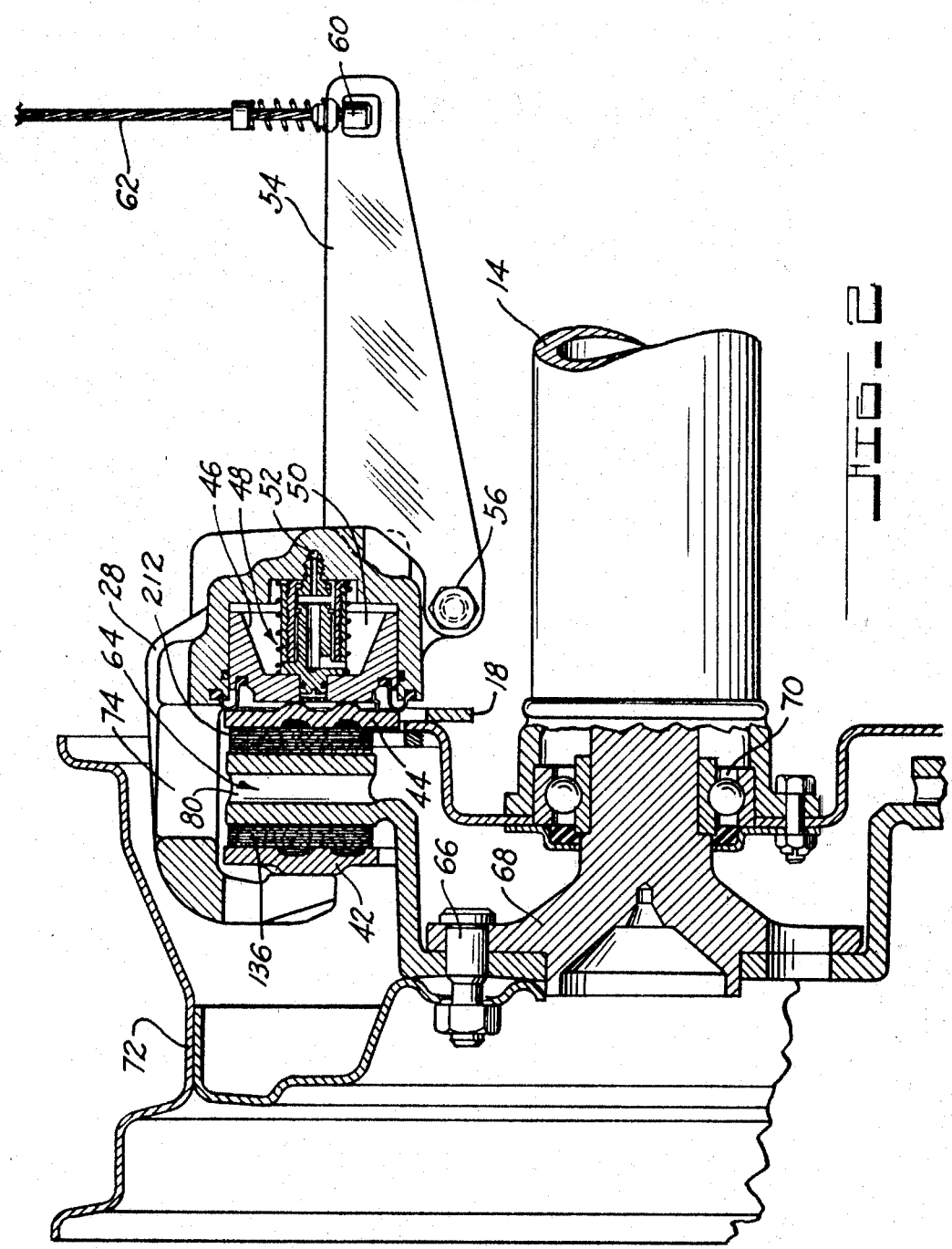

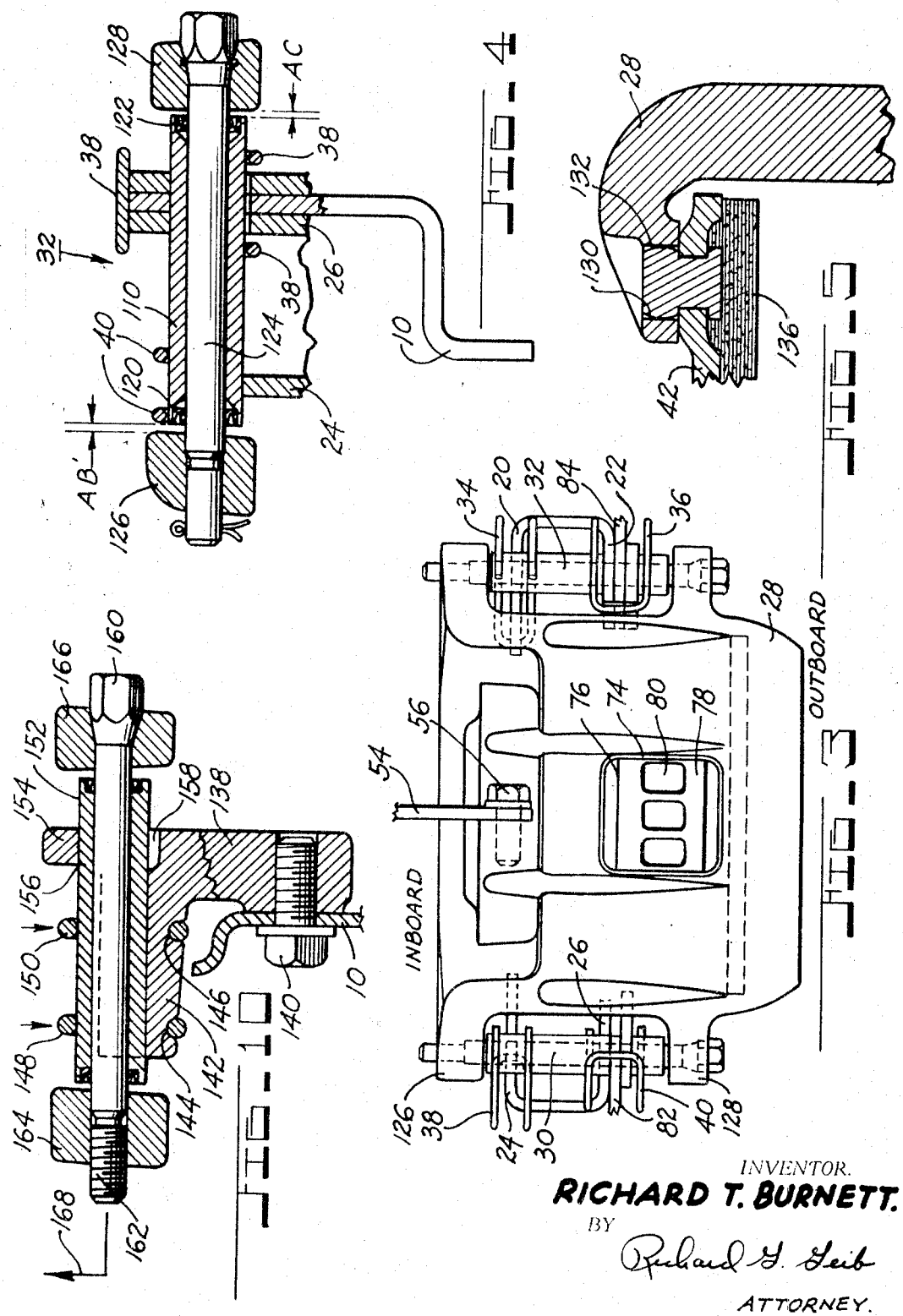

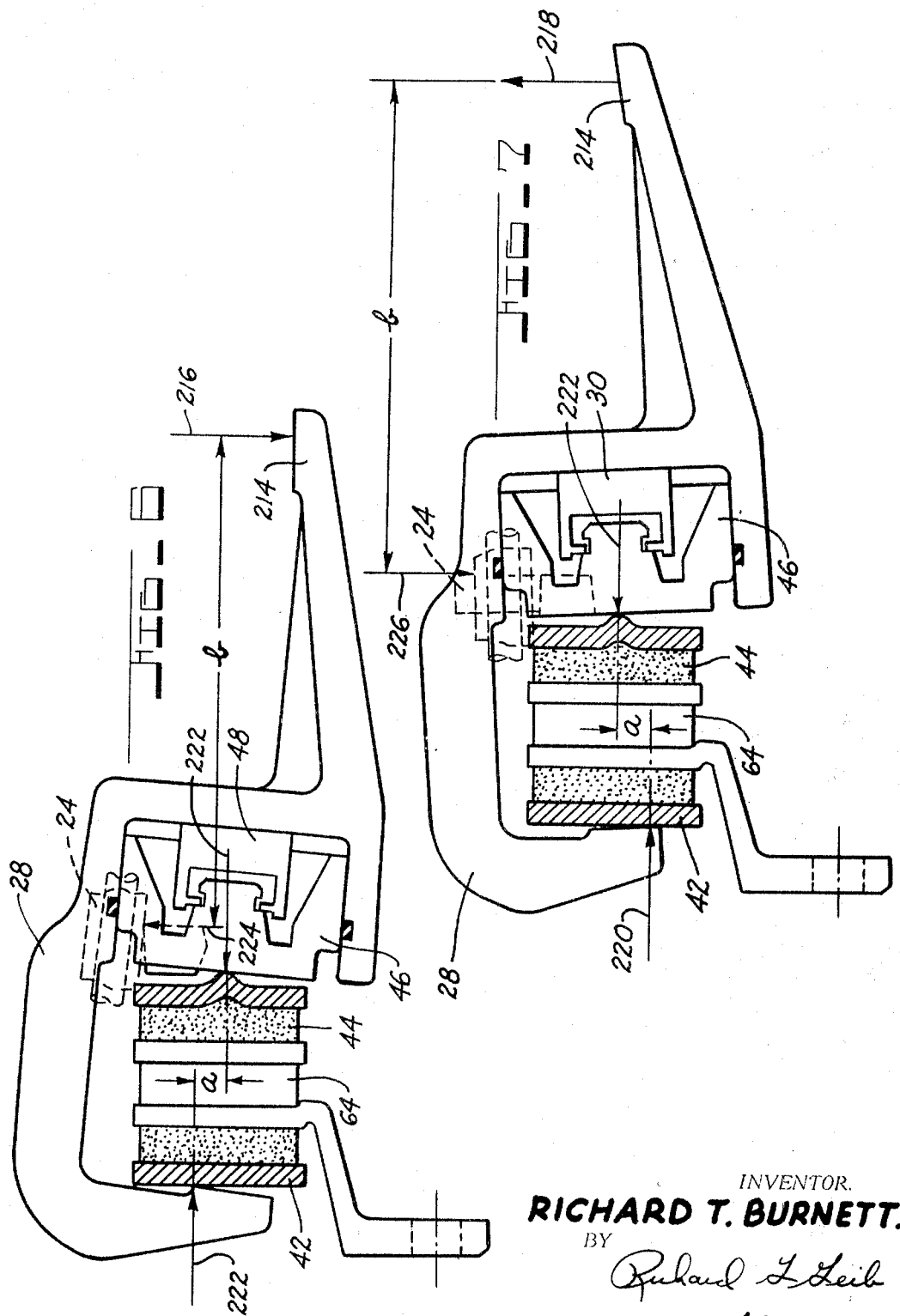

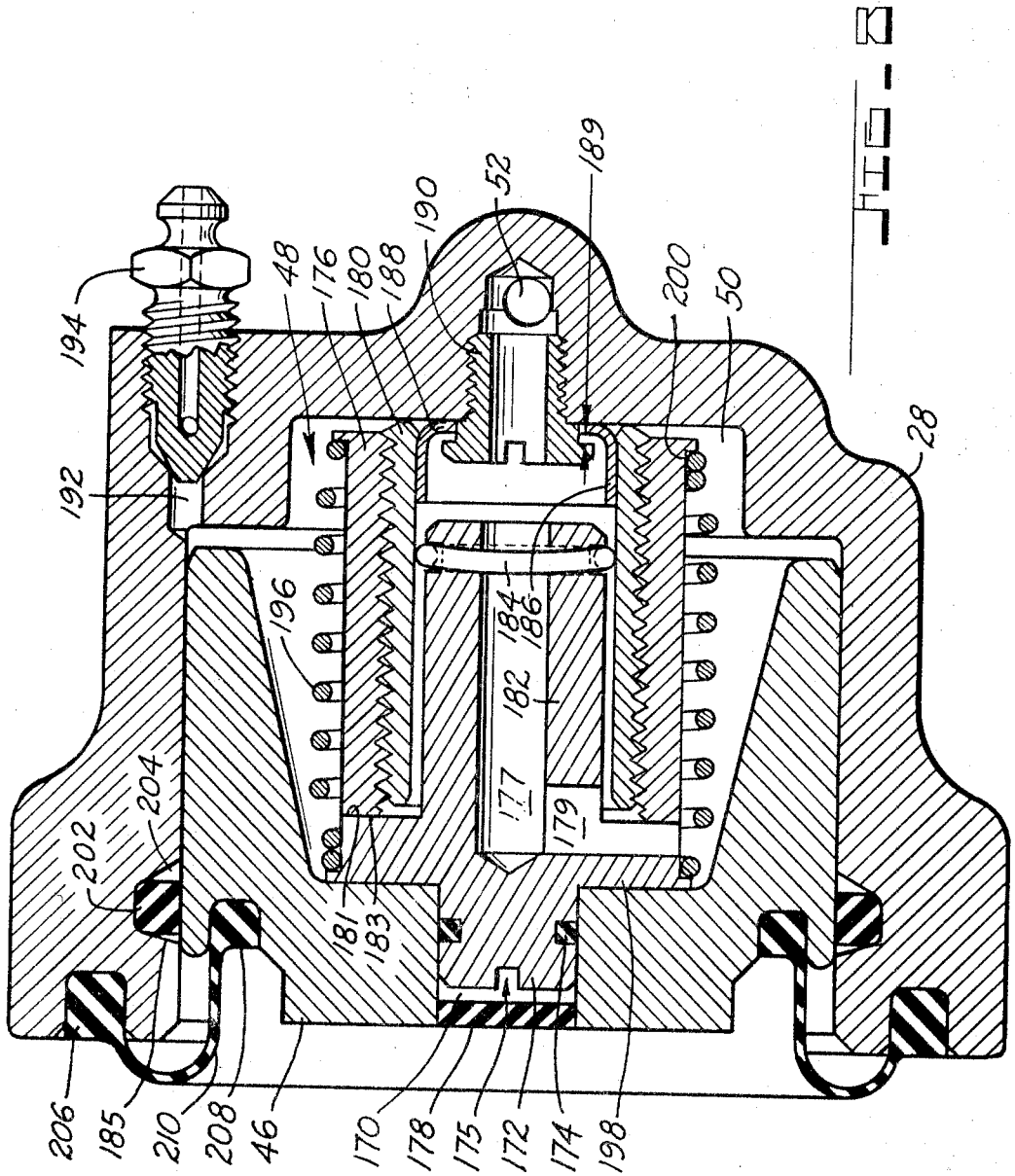

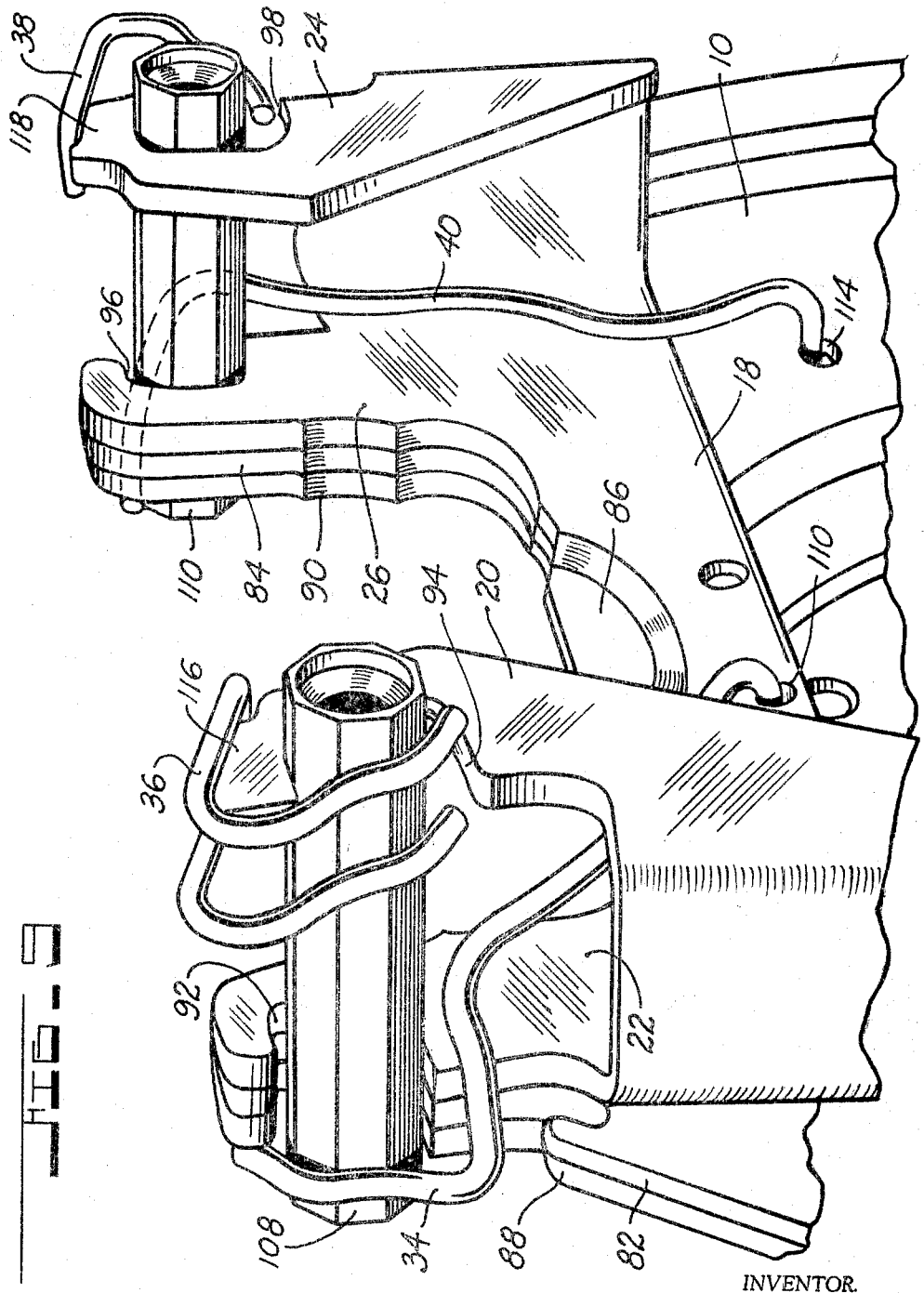

3,460,651
CALIPER DISC BRAKE AND MOUNTING
MEANS THEREFOR
Richard T. Burnett, South Bend, Ind., assignor to The
Bendix Corporation, a corporation of Delaware
Filed Nov. 14, 1967, Ser. No. 682,846
Int. Cl. F16d 55/00, 65/14, 65/38
U.S. Cl. 188—73                                    18 Claims

ABSTRACT OF THE DISCLOSURE

This invention pertains to a floating head caliper disc brake which is mounted with respect to a support structure so as to permit wrenching of its friction elements against a rotatable disc. The floating head caliper envisioned for use in this invention permits hydraulic and mechanical braking of the disc in that it is provided with a hydraulic cylinder and a structure which can be moved to pivot a housing for the caliper on its support and wrench the pads as aforementioned.

Summary

This invention is an improvement to my U.S. Patents Nos. 3,388,774 and 3,410,371 related to a floating head caliper brake means. This invention is also concerned with an improved adjusting mechanism with regard to that shown in U.S. Patent No. 3,344,891.

More specifically it is related to a mounting means which is so designed as to permit angular motion of the brake means to wrench the friction elements against a brake disc to provide a mechanical parking brake feature with no added structure required.

Furthermore, this invention has as a principal object the utilization of a brake adjuster mechanism as a stop means for the brake actuator during parking brake application.

Additionally this invention includes improvements to the art of brake adjusting means by teaching the use of friction means with rotatable means to provide stepless adjustment.

Drawing description

FIGURE 1 is a partial elevational view of the disc brake of the invention taken from the inboard side as mounted on a vehicle;

FIGURE 2 is a cross sectioned side view of the disc brake and wheel assembly for the vehicle;

FIGURE 3 is a top plan view of the brake and spring mounting to a bracket of the backing plate;

FIGURE 4 is a cross sectioned side view of the pin and sleeve element and spring mounting to the bracket;

FIGURE 5 is a partial cross sectioned side view of the caliper brake means showing the outboard side and the connection therewith of the outer friction element; i.e., the friction element on the wheel side of the disc;

FIGURE 6 is a schematic view of the caliper brake means with a mounting arrangement that upon a downward force wrenches the friction elements against the disc for braking;

FIGURE 7 is a schematic view of the caliper brake means with a mounting arrangement that upon an upward force wrenches the friction elements against the disc for braking;

FIGURE 8 is an enlarged partial cross sectional side view of the caliper brake means showing the automatic adjuster mechanism of FIGURE 2 in greater detail;

FIGURE 9 is an isometric view of a modified caliper brake mounting means within the spirit of this invention in reference to the arrangement of FIGURE 1; and FIGURE 10 appearing on sheet 3 of the drawings is a cross sectioned side view of a disc brake backing plate and torque taking bracket for mounting a floating caliper disc brake also within the spirit of this invention.

Detailed disclosure

Referring now to the drawings, and more particularly to FIGURE 1, there is illustrated a stationary support member 10, or backing plate, as it may be termed, which is affixed to a flange 12 of an axle housing 14 as by bolts 16. A support means or mounting bracket 18 (see FIGURES 2 and 9 also) is affixed to the support member 10 as by welding or bolting it thereto. This bracket has axially spaced arms 20, 22 and 24, 26 (see FIGURE 9) at each end thereof for supporting a caliper housing 28 which is mounted thereto by means of pin and sleeve assemblies 30 and 32, whose construction is better seen in FIGURE 4, and springs 34, 36 and 38, 40 at the respective spaced ends, whose attitude and relationship is better seen in the isometric view of FIGURE 9.

With reference now to FIGURE 2, the caliper housing 28 is shown to comprise opposed members 42 and 44 and an actuating element or piston 46 with an adjuster mechanism 48 between the piston 46 and the end of a bore in the caliper housing 28 to form a variable volume actuating chamber 50 therebetween that has a fluid pressure inlet 52 provided thereto. Furthermore, the caliper housing 28 has a lever 54 mounted thereto, as by a bolt 56 (see FIGURE 1). This lever is provided with a slotted connection for receiving a cable end fitting 60 of a parking brake actuator cable 62.

A disc 64 is affixed by bolts 66 to an axle 68 rotatably supported by bearing 70 in the axle housing 14, which bolts 66 also mount a wheel 72. The disc's peripheral section has opposite faces operatively related to the members 42 and 44 of the caliper housing 28. The plan view of this assembly is shown in FIGURE 3. Wherein in looking inwardly through the opening 74 of the caliper housing 28, the disc is shown to have side portions 76 and 78 joined by intermediate structure 80 for the best possible heat transfer and air cooling. It should also be noted that in FIGURE 3 that the backing plate 10 is provided with outwardly projecting arms 82 and 84, and in a preferred form, a reinforcing plate 86 (see FIGURE 9) having similar axially spaced arms 88 and 90 is affixed to the front face of the backing plate 10 similarly to the affixing of the bracket 18 thereto.

Referring back now to FIGURE 1, the springs 34 and 36 are adapted to unite the pin and sleeve assembly 30 within slots, such as slots 92, 94 of arms 20, 22 and 96, 98 of arms 24, 26 of the structure seen in FIGURE 9. However, with regard to the spring arrangement of FIGURE 1, the springs 34 and 36 create an angled downward force vector and an angled upward force vector on the sleeve assembly 30, which force vectors are depicted by the arrows 100 and 102; whereas the springs 40, 38 are designed to in the installed attitude create normal up and down forces on the sleeve assembly 32 as shown by the arrows 104 and 106. As can be seen in FIGURE 9, sleeves 108 and 110 of the respective sleeve assemblies 30 and 32 are provided with an octagonal shape to have a plurality of flats for engagement with the ends of the springs 34, 36 and 38, 40 such that the force vectors aforementioned can be accomplished whereby the sleeves 108 and 110 are held, in the embodiment of FIGURE 1 to be on the lower and inboard flat faces of the slots 94 and 98 of the arms 20, 24, and in FIGURE 9 on the lower and inboard flat faces of the slots 92 and 96 of the arms 22 and 26 respectively. This will in either event permit limited clearance between the sleeves 108 and 110 and the opposite face of the slots so that the caliper housing 28 may be pivoted with respect to the mounting bracket 18 in opposition to the bias of the springs as will be mentioned in more detail hereinafter. It should be noted, however, that the springs 34, 36 and 38, 40 are designed in the case of springs 34 and 40 to be operatively connected to hole 110 in the bracket 18 and hole 114 in backing plate 10; whereas the springs 36 and 38 have connection with ears 116 and 118 of the respective arms 20 and 24 as viewed in FIGURE 1, with similar ears on the inboard arms 22 and 26.

With reference now to FIGURE 4, the pin and sleeve assembly is shown in more detail to comprise the sleeve 110 having rolling action type seals 120 and 122 at each of its ends and a pin 124 slidably arranged within the sleeve 110. The pin 124 is adapted to extend through ears 126 and 128 of the caliper housing 28 on the inboard and outboard sides thereof respectively so that the caliper housing may slide relative to the support member or backing plate. The seals 120 and 122 will prevent contaminants from entering into the sliding relationship of the sleeve 110 and pin 124 whereby this sliding relationship is operable over an extended life cycle than heretofore thought possible.

FIGURE 5 shows a partial cross section of the caliper housing 28 extending outboard of the disc to provide a detailed description of the pivotal mounting arrangement of the member or friction element 42 therewith which comprises a spherical surface 130 fitting within a drilled opening 132 of the caliper housing 28 so that the caliper housing 28 may pivot with respect to the friction element 42 without destroying the alignment of the lining 136 with the outboard face of the disc 64.

Before passing from this sheet of the drawing containing FIGURES 3, 4 and 5, it may be well to discuss at this time a modification in the mounting arrangement for the bracket and pin sleeve assembly that has been visualized in regard to FIGURE 10. This modification utilizes a bracket 138 bolted, as by bolt 140, to the backing plate 10. This bracket 138 has an axially extending boss 142 which is grooved as at 144 and 146 for receipt of U-shaped spring members 148 and 150.

The bracket 138 has a cast pocket in its outboard face to provide a space 158 immediately underlying the sleeve 152 adjacent the outboard end of the bracket 138. Furthermore, as presently visualized, the boss 142 may be formed to contact only two sides of sleeve 152 so that there is no upward restraint on the inboard end of the sleeve 152. Again, a pin 160, which is threaded as at 162 to the inboard ear 164 of the caliper housing and taper fitted with respect to the outboard ear 166 of the caliper housing joins the caliper housing to the sleeve 152. It should be noted that the action of the springs 148 and 150 is to hold the sleeve element 152 on the lower flat surface of notch similar to notch 96 of FIGURE 9. Thus, a pulling action in the direction of the arrow 168 may pivot the caliper housing as in the former constructions about pin 156.

As the description of FIGURES 6 and 7 will be more germane to the operative description of this specification, it is desired to skip over them for the moment to go directly to the structure of FIGURE 8 showing a cross section through the caliper housing in exploded forms whereby the reader may more readily visualize the internal details of the actuating mechanism for the friction elements 42 and 44. More particularly, there is shown the piston 46 having a centrally drilled opening 170 within which a projection 172 having seal 174 of a piston adaptor 175 having a radial flange 198 and a cylindrical extending portion 182 is operatively related. Fluid passages 177 and 179 in piston adaptor 175 provide for bleeding of air from the various pockets in the adjuster 48. After this projection is fitted within the hole 170 a plug 178, if desired, is placed on the outboard face of the piston to seal the internal details from contaminants that may be generated from the friction element 44 operatively related therewith, as seen in FIGURE 2. A sleeve nut 176 is threadedly related to a sleeve 180 having exterior threads of similar pitch as the interior threads of the sleeve nut 176. The sleeve 180 is threaded to the sleeve nut 176 over the cylindrical extending portion 182 of the piston adaptor 175 which is provided with a spring ring 184 which frictionally connects the piston adaptor 175 with the sleeve 180. In addition, the sleeve 180 is welded or similarly joined to a cap 186 having inwardly projecting flange 188 fitted under head of a screw member 190 so as to prevent rotation of the sleeve 180 but to allow a small predetermined axial movement controlled by the gap 189. The screw member 190 is shown as a hollow fitting in order to provide fluid communication from the inlet 52 to the chamber 50 between the piston 46 and the end of the bore in the caliper housing 28 by way of passages 177 and 179. This chamber 150 is preferably opened by means of a passage 192 to a bleed screw fitting 194 at its uppermost surface in order that when installed, all air may be bled from the actuating variable volume chamber 50. It should be understood that the sleeve nut 176 and the sleeve 180 with its cap 186 and the fitting 190 are assembled prior to the closing of the chamber 50 by the piston 46. During assembly a torsion spring 196 is installed between radial flange 198 of the piston adaptor 175 and innermost end of sleeve 200 of sleeve nut 176 so as to impose a rotational force on the sleeve nut 176. The ends of the torsion spring 196 are of reduced diameter so as to frictionally grip piston adaptor 175 and sleeve nut 176. Flange 198 has a flat surface 183 which abuts a flat surface 181 of sleeve nut 176.

Upon the assembly of the internal brake adjuster mechanism 48 comprised of the parts aforementioned to the housing 28, the piston 46 is placed within the bore after a seal 202 is fitted within the groove 204 of the caliper housing 28. This groove 204 is machined to have an inclined face 185 so that the seal 202 will exert a return force on the piston 46 after the piston has been actuated by fluid pressure delivery into the chamber 50. The assembly is completed by affixing beads 206 and 208 of a diaphragm seal 210 to the caliper housing 28 and the piston 46, respectively, and the insertion of the disc 178 into the opening 170 centrally of the piston 46 upon setting of the proper dimensional relationship of the adjuster mechanism 48.

Operation

With regard to the operation of applicant's braking mechanism in reference to the figures, it can be seen that the housing 28 has rigidly secured thereto, the pin elements 124 which are slidingly retained by the sleeve elements 108 and 110. The pin elements and sleeve elements in combination provide a bearing member for each of the two circumferentially spaced arms 20, 22 and 24, 26 of the backing plate 10 which floatingly and slidingly carry the housing 28 for movement in a direction transverse to the faces of the disc 64. Springs 36, 34 and 38, 40 secure the sleeves to the arms 20, 22 and 24, 26 on flat surfaces at the rear of slots 92, 94 and 96, 98 and on upper or lower flat surfaces of the same slots as the design would so dictate for wrenching of the caliper housing 28 in parking brake applications as will be explained hereinafter. The spring action provides a three-fold function, one of which is an anti-rattle function, another of which is establishing a predetermined resilience against sleeve element movement in a direction transverse to the disc faces and another of which is to provide return forces on the housing 28 upon release of the parking brake applicator, such as cable 62. Thus it is clear that there exists two sliding actions and one pivotal action that are important and unique to applicant's device disclosed by this invention. The first sliding action being between the pin element 124 and the sleeves 108 and 110 and the second, but somewhat restricted, sliding action between the sleeves 108 and 110 and the associated arms 20, 22 and 24, 26.

The necessity for the double sliding action results from prior disc brake designs using only a single sliding action generally comprised of pins rigidly mounted to the floating brake shoe housing and semi-circular receiving grooves, for the pins, located in the stationary support member with sufficient tolerancing between the pin and grooves to allow reasonably free sliding action therebetween. This type of design has been known to produce excessive brake rattle experienced during normal driving and to solve the rattle problem members have been added to exert forces against the pin elements to preclude rattle between the pin elements and the slots located in the arms and/or backing plates. Although this technique has produced a solution to the rattle problem, the force against the pin elements by the pressure members introduced an undesirable resistance to lateral sliding of the pin elements, and thus also the caliper housing. This resistance to lateral sliding caused a condition frequently referred to in the disc brake industry as "knock-back." "Knock-back" results from a deflection or wandering of the brake disc which engages a brake lining and friction member and thus the piston, forcing the piston back into its associated cylinder. "Knock-back" is highly objectionable in that is requires upon the next brake application, that the brake pedal travel an unnecessary distance for the brake piston to again engage the friction and lining member forcing them to grip the rotating disc. With the double sliding action of applicant's device, the rattle and "knock-back" problems have been eliminated.

Now with more particular reference to the operation of applicant's device and assuming the direction of rotation of the disc 64 to be clockwise as shown by the arrow in FIGURE 1, upon a brake application fluid pressure will build up in chamber 50 behind the piston 46 urging the friction member 44 against its adjacent disc surface and simultaneously with the movement of friction member 44, friction member 42 is caused to engage the opposite surface of the disc 64, as a result of the hydraulic reaction build up in the chamber 50 which is transmitted back through the housing 28 causing it to move axially in the bearing members comprised of the sleeve assemblies 30 and 32 located in their respective circumferentially spaced arms 20, 22 and 24, 26 of the torque taking member of bracket 18 to thereby establish a clamping action between the friction elements and the disc 64.

Initially, that is at the time of assembling the brakes on the vehicle, piston 46, as viewed in FIGURE 2, has been given a position by the adjuster mechanism 48 in the bore of the housing 28 depending upon the thickness of the friction member 44, which is interposed between the piston end and the surface of the disc 64. The friction member 42 also has a fixed definite relationship at the time to the surface of the disc 64. Actually, the linings 212 and 136 of the friction members 44 and 42 are in contact relationship with their respective adjacent disc faces. The sleeves 108 and 110 carried in the slots 92, 94 and 96, 98 of the arms 22, 20 and 26, 24, respectively, also have a given position intermediate the ears 126 and 128; this relationship does not always exist from a practical standpoint. Under normal operating conditions with the friction elements located so that the friction surfaces of the lining material 212 and 136 are in slight contact relationship with respect to the respective surfaces of the disc 64, lateral displacement of the disc 64 would slide or shift the housing 28 on the pin members 124 in the sleeves 108 and 110 mounted in the circumferentially spaced arms 20, 22 and 24, 26. In other words, lateral disc deflections of a small magnitude will allow the housing to freely shift or slide in the sleeves 108 and 110 due to the fact that the gaps AB and AC (see FIGURE 4) are not closed; i.e., there is no actual engagement between the ends of the sleeves and their respective associated ears. The sleeves 108 and 110 are shifted inboard as the lining wears by an occasional contact between the outboard ears 126 of the caliper housing 28 and the outboard end of the sleeves 108 and 110. This shifting will occur when an increment of wear has accrued in combination with a maximum inboard excursion of the disc 64 due to axle deflections as occurs in cornering maneuvers of the vehicle resulting in side forces on the tire, wheel and axle. This repositioning of the sleeves 108 and 110 is resisted by friction forces due to spring loading and anchoring of the caliper housing when the brakes are applied. However, if the brakes are even lightly applied during a cornering maneuver large forces are clamping the caliper to the disc and the caliper will move inboard with the disc overcoming the friction forces between the sleeves and mounting bracket.

When the wheel and disc resume their normal position in straight ahead movement of the vehicle, the housing will move outboard re-establishing the gap between the sleeves and the housing. This movement is taken on the bearings of the pin and sleeve assemblies. With reference now to FIGURE 8, it should be noted that upon actuating of the piston 46 as by introducing a fluid pressure to the chamber 50, the piston will move outwardly until the flange 188 of the cap 186 engages the head of the screw member 190. If further movement of the piston 46 is desired to get adequate braking the pressure in the chamber 50 will force the friction relationship caused by the ring 184 between the piston adaptor 175 and the sleeve 180 to slide within the sleeve 180 until the desired braking relationship is established between the linings 212 and 136 and the disc 64.

When the piston adaptor 175 moves with respect to sleeve 180 and its threadedly attached sleeve nut 176, a gap is opened at surface 181 of the piston adaptor 175 where it contacts surface 183 of the sleeve nut 176. When this occurs, the torsion spring 196 causes a rotation of the sleeve nut 176, closing the gap and producing the desired adjustment of the piston position when pressure is released.

When chamber 50 is pressurized, the piston 46 will move toward the disc and the seal 204 will be deformed against the outer angled surface 185 of the seal groove. When pressure is relieved, the seal springs back to its normal installed shape causing a retraction of the piston. The retraction of the piston relieves the pressure of the friction members 42 and 44 against the disc 64 and cause the flange 188 to move away from the head screw member 190 re-establishing a gap between them but not necessarily to the extent that sleeve 180 will contact the bottom of the cylinder.

It should be understood at this juncture that if it is desired to replace the friction members 42 and 44 that the removal of these elements from within the caliper housing will then allow an operator to remove the plug 178 and by means of a screw driver within the slot of the projection 172 shown readjust the adjusting mechanism to its normal position shown in FIGURE 8 with new linings thereafter installed.

Now with regard to the parking brake application of the caliper housing the reader's attention is directed to FIGURES 6 and 7 howing applicant's invention in the schematic form for both push and pull parking brake operation, respectively. In this schematic form, there is however another embodiment shown whereby the caliper housing 28 is cast with a lever 214 as an integral part thereof and to which the cable 62, FIGURE 2, may be attached. In that the adjusting mechanism 48 prevents the retraction of the piston 46 into caliper housing 28 beyond a predetermined small distance, and in that the friction member 44 is pivotally related to the face of the piston 46, and because of the pivotal mounting of the friction member 42 with the caliper housing 28, aforedescribed, the cable 62 may be operated to direct a pushing force in the direction of arrow 216 of FIGURE 6 or a pulling force in the direction of arrow 218 of FIGURE 7 to pivot the caliper housing in opposition to the springs 34, 36 and 38, 40 of the one embodiment or the springs 148 and 150 of the other embodiment to wrench the friction linings of the friction elements 42 and 44 into braking contact with the disc 64 as shown. In that the moment arm $a$ between the compression forces 220 and 222 is substantially less than the moment arm $b$ between the applying force 216 and its reaction force 224, or between applying force 218 and its reaction force 226 there occurs a large force multiplication to provide maximum parking brake action with a minimum of force applied to the cable 62. It results also that the mounting springs aforementioned will return the caliper housing 28 to its normal attitude upon release of the parking brake applicator connected to the cable 62, and that because of the utilization of the housing as a means to apply the parking brake, the braking forces are well centered with respect to the friction elements so that maximum braking effectiveness is equated to that of hydraulic brake application.

Having fully described an operative construction of my invention and several embodiments therefor, it is now desired to set forth the true and proper scope sought by these Letters Patent in the appended claims.

I claim:

1. A disc brake comprising:
   a rotating disc;
   a fixed support;
   a floating head caliper having piston means therein operatively related to an outer friction element and an inner friction element for braking said disc;
   means to support said caliper including a torque-taking member having circumferentially spaced arms with inboard and outboard portions circumferentially spaced with respect to said disc, circumferentially spaced pin means, spaced resilient means connecting said pin means to said arms which pin means also join said housing therewith such that said housing moves relative to said disc in a direction transverse to the disc's plane, said pin means being held by said resilient means to said arms such that angular motion of a limited degree is permitted of said housing and its normal attitude is restored upon release by said resilient means; and
   an arm extending from said housing for moving said housing obliquely to the plane of said disc.

2. The structure of claim 1 wherein said outboard friction element is pivotally mounted to said housing such that the moment arm created by angular movement of the housing is held to a minimum whereby the force applied to the housing arm is multiplied at the outer and inner friction elements.

3. A disc brake comprising:
   a rotatable disc;
   a floating head caliper having a housing within which hydraulic piston means is operative, said housing also mounting an outer friction element;
   an inner friction element operatively connected to said piston means;
   means supporting said caliper to position the outer friction element and inner friction element on opposite sides of said disc, said means consisting of a pin and sleeve means having relative axial movement therebetween, which pin and sleeve means is pivotally supported on axially spaced arms of a torque taking member at each end of the caliper by resilient means adjacent each end so as to permit limited angular motion between the caliper and disc to wrench the inner and outer friction elements into engagement with the rotor and the return of the caliper to its normal rest position; and
   a lever arm attached to said caliper for angularly moving the caliper to cause the wrenching aforementioned.

4. A disc brake according to claim 3 wherein one of the arms, the one closest the disc, pivotally supports said pin means.

5. A disc brake according to claim 4 wherein the resilient means is characterized as spring means at each end of the caliper with the spring means at one end having force components whereby force at one end is approximately perpendicular to a line through the centers of the pin means and the spring means at the other end has at least a substantial force component along a line through the centers of the pin means.

6. The structure of claim 5 wherein said pin means has at least two flat faces for contact with said torque-taking member.

7. The structure of claim 6 wherein the spring means in addition to mounting the caliper to the torque-taking member acts as a return spring to reposition the caliper after the arm is released whereby the disc is free of the outer and inner friction elements.

8. A disc brake comprising:
   a rotatable disc;
   a support member mounted adjacent said disc including a bracket assembled to said support member to provide circumferentially spaced outboard and inboard slots with upper, lower and inside flats;
   a caliper brake means operatively related to said disc to have outer and inner friction elements on respective sides of said disc for engagement therewith to brake said disc, said caliper brake means having an inboard extending arm;
   pin and sleeve means affixed to circumferentially spaced portions of said caliper to extend normal to said disc; and
   means to resiliently bias said sleeve means against said inside flats and against an upper flat and a lower flat with respect to said outboard and inboard slots to permit angular motion of said caliper brake means with respect to the disc by an appropriate push or pull motion on said arm to wrench the outer and inner friction elements into engagement with said disc.

9. The structure of claim 8 wherein said outer and inner friction elements are pivotally connected to said caliper brake means to permit the torquing of said caliper brake means without disturbing the parallel attitude of said friction elements with their respective faces of said disc.

10. The structure of claim 8 wherein the sleeve means at each end of the caliper brake means is provided with seal means at each of its ends, each seal being secured to said sleeve means and resiliently and slidingly engaging said pin element to thereby exclude contaminants from between said pin means and said sleeve means.

11. The structure of claim 8 wherein said caliper brake means is characterized by a housing straddling said disc with the outer friction element having a ball connection with an outer portion of the housing and the inner friction element being rockable with an actuating piston adapted to be actuated by fluid pressure introduced within the housing to a chamber behind said piston.

12. The structure of claim 11 wherein said sleeve means has flat portions for engagement with the spaced flats at one end so as to have a rocking axis along the inboard edge of one of the spaced flats, which spaced flats are on opposite sides of said sleeve means.

13. The structure of claim 8 wherein said sleeve means has flat portions for engagement with the upper flat and the inboard flat at one end and with the lower flat and the inboard flat at the other with clearance between the flats of the slots not so in abutment to permit angular displacement of said caliper brake means.

14. The structure of claim 13 wherein said means to resiliently bias said sleeve means includes spring means at one end providing an angular force component to maintain the said abutment and spring means at the other end providing a vertical force component to maintain the said abutment thereat.

15. The structure of claim 13 wherein the sleeve means at each end of the caliper brake means is provided with seal means at each of its ends, each seal being secured to said sleeve means and resiliently and slidingly engaging said pin element to thereby exclude contaminants from between said pin means and said sleeve means.

16. A disc brake comprising:
a rotatable disc;
a support member mounted adjacent said disc including a bracket assembled to said support member to provide circumferentially spaced outboard and inboard slots with flats;
a caliper brake means operatively related to said disc to have outer and inner friction elements on respective sides of said disc for engagement therewith to brake said disc, said caliper brake means having an inboard extending arm;
pin means affixed to circumferentially spaced portions of said caliper to extend normal to said disc; and
means to resiliently connect said pin means to said bracket obliquely through said slots to permit angular motion of said caliper brake means with respect to the disc by an appropriate push or pull motion on said arm to wrench the outer and inner friction elements into engagement with said disc.

17. The structure of claim 16 wherein said outer and inner friction elements are pivotally connected to said caliper brake means to permit the torquing of said caliper brake means without disturbing the parallel attitude of said friction elements with their respective faces of said disc.

18. The structure of claim 16 wherein said caliper brake means is characterized by a housing straddling said disc with the outer friction element having a ball connection with an outer portion of the housing and the inner friction element having a rockable abutment with an actuating piston adapted to be actuated by fluid pressure introduced within the housing to a chamber behind said piston.

References Cited

UNITED STATES PATENTS

| | | | |
|---|---|---|---|
| 2,655,229 | 10/1953 | Eksergian | 188—73 X |
| 2,966,964 | 1/1961 | Brueder | 188—73 |
| 3,255,851 | 6/1966 | Griesenbrock. | |
| 3,265,160 | 8/1966 | Elberg et al. | 188—73 |
| 3,266,602 | 8/1966 | Belart et al. | 188—73 |
| 3,365,028 | 1/1968 | Hajek | 188—73 |
| 3,388,774 | 6/1968 | Burnett | |

FOREIGN PATENTS 1,345,151   10/1963   France.

GEORGE E. A. HALVOSA, Primary Examiner

U.S. Cl. X.R.

188—106, 196